US008956265B2

(12) United States Patent
Chin et al.

(10) Patent No.: US 8,956,265 B2
(45) Date of Patent: Feb. 17, 2015

(54) METHOD AND APPARATUS FOR EXECUTING A CLUTCH-DRIVEN ENGINE AUTOSTART OPERATION

(75) Inventors: Poh Fong Chin, Novi, MI (US); Jean Marie Miller, Plymouth, MI (US); Allen J. Lehmen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 13/557,424

(22) Filed: Jul. 25, 2012

(65) Prior Publication Data
US 2014/0031171 A1  Jan. 30, 2014

(51) Int. Cl.
*B60W 10/00*  (2006.01)

(52) U.S. Cl.
USPC ........................................................ 477/84

(58) Field of Classification Search
USPC .............. 477/5, 6, 83, 84, 70, 107, 110, 166, 477/167, 174, 175, 181; 903/912, 930, 946
See application file for complete search history.

(56) References Cited

U.S. PATENT DOCUMENTS

| 7,476,176 | B2 * | 1/2009 | Ibamoto et al. ................. 477/15 |
| 8,647,234 | B2 * | 2/2014 | Tsutsui et al. .................. 477/70 |
| 2004/0079564 | A1 * | 4/2004 | Tabata .......................... 180/65.2 |
| 2009/0118879 | A1 * | 5/2009 | Heap et al. ...................... 701/22 |
| 2010/0305800 | A1 * | 12/2010 | Lehmen et al. ................. 701/29 |

* cited by examiner

*Primary Examiner* — Justin Holmes

(57) ABSTRACT

A powertrain system includes an internal combustion engine, a multi-mode transmission and a driveline. A method for controlling the powertrain system in response to a command to execute an engine autostart operation during vehicle operation includes executing a clutch-driven engine autostart operation to start the engine upon determining that a present transmission output speed is greater than a minimum output speed for engine operation and upon determining that a selected clutch configured to effect a mechanical coupling between the engine and the driveline is activatable.

15 Claims, 3 Drawing Sheets

METHOD AND APPARATUS FOR EXECUTING A CLUTCH-DRIVEN ENGINE AUTOSTART OPERATION

TECHNICAL FIELD

This disclosure is related to powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently from a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque among the engine, the torque machines and the driveline. Operation of a powertrain system includes activating and deactivating the clutches to effect operation in selected operating states.

SUMMARY

A powertrain system includes an internal combustion engine, a multi-mode transmission and a driveline. A method for controlling the powertrain system in response to a command to execute an engine autostart operation during vehicle operation includes executing a clutch-driven engine autostart operation to start the engine upon determining that a present transmission output speed is greater than a minimum output speed for engine operation and upon determining that a selected clutch configured to effect a mechanical coupling between the engine and the driveline is activatable.

BRIEF DESCRIPTION OF THE DRAWINGS

One or more embodiments will now be described, by way of example, with reference to the accompanying drawings, in which:

FIGS. 2-1, 2-2, and 2-3 illustrate lever diagrams for the transmission operating at zero speed, operating in a continuously variable mode with the engine in an off state, and operating in a fixed gear mode with the engine transitioning to an on state, in accordance with the disclosure;

FIG. 3 illustrates transmission output speed in relation to various input speeds, in accordance with the disclosure.

DETAILED DESCRIPTION

Figure 1:
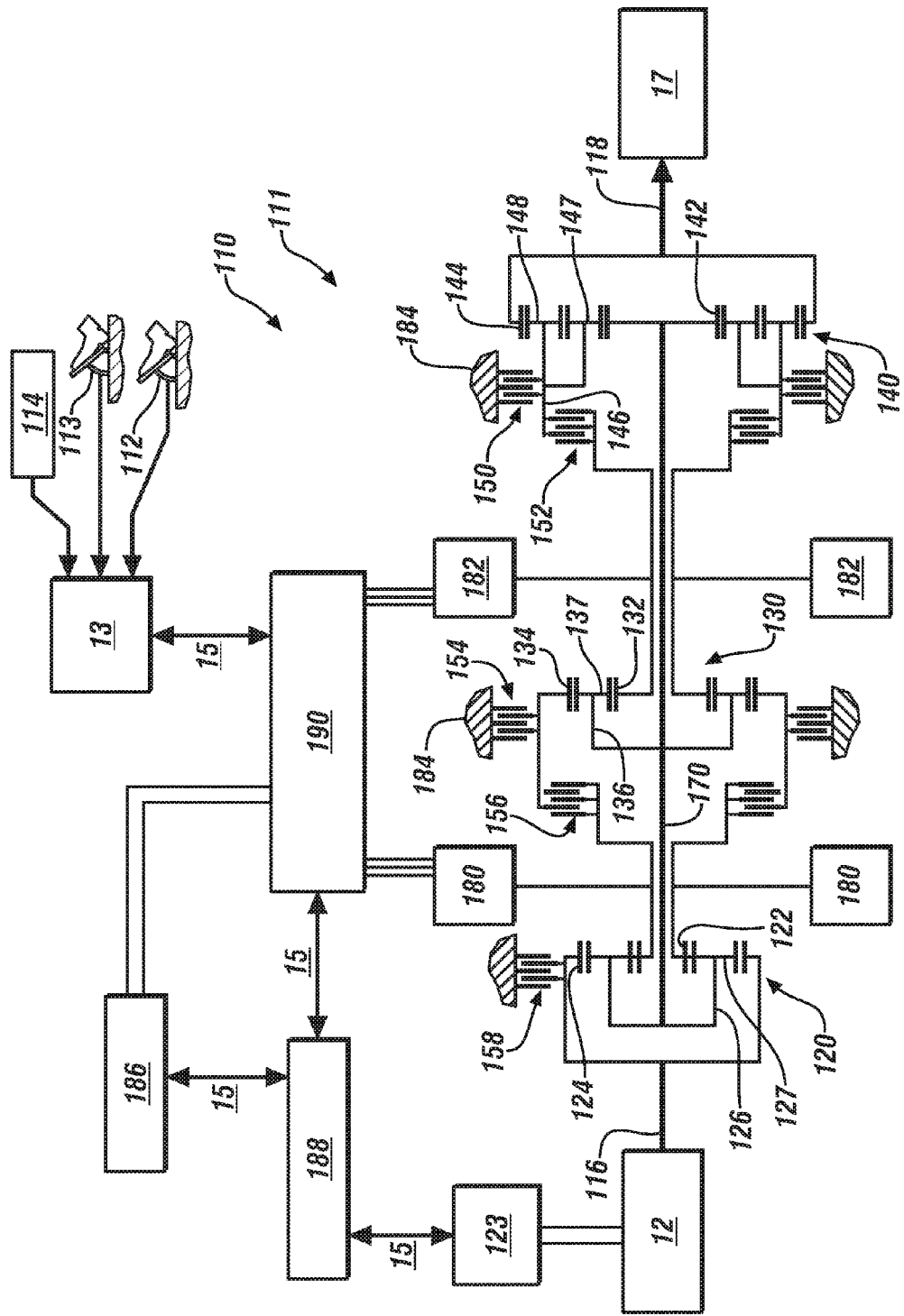
FIG. 1 illustrates a powertrain system including an internal combustion engine, a multi-mode transmission, a driveline, and a controller, in accordance with the disclosure.

Referring now to the drawings, wherein the showings are for the purpose of illustrating certain exemplary embodiments only and not for the purpose of limiting the same, FIG. 1 shows an embodiment of a powertrain 110 including an engine 12 and a transmission 111 that are coupled to a final drive mechanism 17. The engine 12 couples to the transmission 111 via an input member 116. The transmission 111 is preferably a multi-mode transmission that includes an output member 118 rotatably coupled to the final drive mechanism 17. The embodiment of the transmission 111 includes three planetary gear sets 120, 130, and 140 and is configured to receive at least a portion of its driving power from the engine 12 in some of its operating modes. The transmission 111 couples to first and second torque machines 180 and 182, respectively, e.g., electric motor/generators. The transmission 111 is configured to transfer torque among the engine 12, the torque machines 180, 182, and the output member 118 in response to an output torque request. The powertrain 110 described herein with reference to the engine 12, transmission 111, and the torque machines 180, 182 is employed to illustrate the concepts set forth herein. The powertrain 110 may include any configuration of an internal combustion engine, transmission, and torque machine(s) that is configured for direct mechanical coupling between the engine and the final drive mechanism 17 wherein the engine 12 is configured to execute autostop and autostart operations during ongoing vehicle operation. The first and second torque machines 180, 182 described herein are electric motor/generators that employ electric energy. Alternatively the torque machines may employ hydraulic energy, pneumatic energy, or another suitable energy source to generate torque. A user interface 13 is preferably signally connected to a plurality of devices through which a vehicle operator directs and commands operation of the powertrain system. The devices preferably include an accelerator pedal 113, an operator brake pedal 112, a transmission range selector 114 (PRNDL), and a vehicle speed cruise control. The transmission range selector 114 may have a discrete number of operator-selectable positions. The user interface 13 may include a single device, as shown, or alternatively may include a plurality of user interface devices directly connected to individual control modules.

The planetary gear set 120 includes a sun gear member 122, a ring gear member 124, and a carrier member 126. The carrier member 126 rotatably supports a plurality of pinion gears 127 that are disposed in meshing relationship with both the sun gear member 122 and the ring gear member 124. The planetary gear set 130 includes a sun gear member 132, a ring gear member 134, and a carrier member 136 that rotatably supports a plurality of pinion gears 137 that are disposed in meshing relationship with both the sun gear member 132 and the ring gear member 134. The planetary gear set 140 includes a sun gear member 142, a ring gear member 144, and a carrier member 146. The carrier member 146 rotatably supports a first set of pinion gears 147 as well as a second set of pinion gears 148. The first set of pinion gears 147 is disposed in meshing relationship with both the sun gear member 142 and the second set of pinion gears 148. The second set of pinion gears 148 is disposed in meshing relationship with the first set of pinion gears 147 and with the ring gear member 144. Thus, the planetary gear set 140 is a compound, sun gear-pinion gear-pinion gear-ring gear (S-P-P-R) gear set.

An interconnecting member 170 continuously connects the carrier member 126, the carrier member 136, and the sun gear member 142. The interconnecting member 170 may alternatively be two separate components, one connecting the carrier members 126 and 136, and another connecting carrier member 136 with sun gear member 142.

The first torque machine 180 is continuously connected with the sun gear member 122. The input member 116 is connected for common rotation with the ring gear member 124. The second torque machine 182 is connected for common rotation with the sun gear member 132. Ring gear member 144 is connected for common rotation with the output member 118. The first and second torque machines 180, 182 each have a rotor and a stator that is grounded to a stationary member, such as a transmission case. The transmission 111 is configured such that the first and second torque machines 180, 182 are subjected to a substantially equal maximum torque requirement that is required of each respective torque machine at some point during operation in continuously variable modes. This allows the torque machines to have substantially equal sizes. The first and second torque machines 180, 182 electrically connect to an energy storage device 186 such as a high-voltage battery to transfer electric power therebetween. A hybrid control module (HCP) 188 is in signal communication via communications link 15 with the high-voltage battery 186 and with a power inverter 190 that is also in electrical communication with the stator portions of the first and second torque machines 180, 182. The communications link 15 provides structured communications between the HCP 188, the ECM 123, and the user interface 13. The HCP 188 responds to a variety of input signals including vehicle speed, the output torque request, the level at which the high-voltage battery 186 is charged and the power being provided by the engine 12 to regulate the flow of electric power between the first and second torque machines 180, 182 and the high-voltage battery 186 via the inverter 190, which converts between direct current from the high-voltage battery 186 and alternating current from the first and second torque machines 180, 182. The first and second torque machines 180, 182 can be deactivated so no torque is transferred between the engine 12 and the first and second torque machines 180, 182 to avoid charging spikes to the high-voltage battery 186 due to increases in engine speed and torque during engine cold starts. The HCP 188 has supervisory control over an engine control module (ECM) 123 configured to monitor inputs from sensors to determine states of engine parameters. The ECM 123 can further be configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The transmission 111 also includes a plurality of clutches C1 150, C2 152, C3 154, C4 156, and C5 158. The transmission 111 may optionally include clutch C5 158. Clutch C1 150 is a stationary clutch, also referred to as a brake that is selectively engageable to ground the carrier member 146 to a stationary member 184. Clutch C2 152 is a rotating clutch that is selectively engageable to connect sun gear member 132 and motor/generator 182 for common rotation with carrier member 146. Clutch C3 154 is a stationary clutch that is selectively engageable to ground the ring gear member 134 to the stationary member 184. Clutch C4 156 is a rotating clutch that is selectively engageable to connect the motor/generator 180 and the ring gear member 134 for common rotation. Clutch C5 158 is a rotating clutch that is selectively engageable to connect and ground the ring gear member 124 to the stationary member 184.

When the clutch C1 150 is engaged, carrier member 146 is a reaction member within the planetary gear set 140, and power transferred via the interconnecting member 170 will be transferred through the sun gear member 142 to the ring gear member 144 and therefore to the output member 118. When the clutch C2 152 is engaged, the motor/generator 182 receives power from or delivers power to carrier member 146 as well as the sun gear member 132. When the clutch C3 154 is engaged, ring gear member 134 is held stationary and becomes a reaction member within the planetary gear set 130. When the clutch C4 156 is engaged, the motor/generator 180 is connected for rotation with the ring gear member 134, and either receives or accepts power through the ring gear member 134 as well as the sun gear member 122. When clutch C5 158 is engaged, ring gear member 124 is held stationary and becomes a reaction member within the planetary gear set 120, such that the speed of the input member 116 is locked-up.

The powertrain 110 is configured to operate in one of a plurality of powertrain states, including a plurality of ranges of the transmission 111 and engine states of on and off. When the engine 12 is in the off state, it is unfueled, not firing, and is not spinning. When the engine 12 is in the on state it is fueled, firing, and spinning. The transmission 111 is configured to operate in one of a plurality of neutral (Neutral), fixed gear (Gear #), variable mode (EVT Mode #), electric vehicle (EV#) and transitional (EV Transitional State #), pseudoGear #) states through selective activation of the clutches C1 150, C2 152, C3 154, C4 156, and C5 158. Table 1 depicts a plurality of powertrain states including transmission states and engine states for an embodiment of the powertrain 110.

TABLE 1

| Steady State Range | Engine State | C1 | C2 | C3 | C4 | C5 |
|---|---|---|---|---|---|---|
| Neutral 1 | on/off | | | | | |
| Neutral 2 | on/off | | x | | | |
| Neutral 3 | on/off | | | x | | |
| PseudoGear 1 | on/off | x | | | | |
| PseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | x | x | | |
| EV Transitional State 1 | off | x | | | | x |
| EV Transitional State 2 | off | | x | | | x |
| Gear 1 | on | x | | x | x | |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | x | x | | x |
| EV Transitional State 3 | off | x | x | | | x |
| Neutral | on/off | | | x | x | |
| PseudoGear 3 | on/off | x | x | | | |
| Neutral | off | | | x | | x |
| Neutral | off | | | | x | x |

Figures 1, 2:
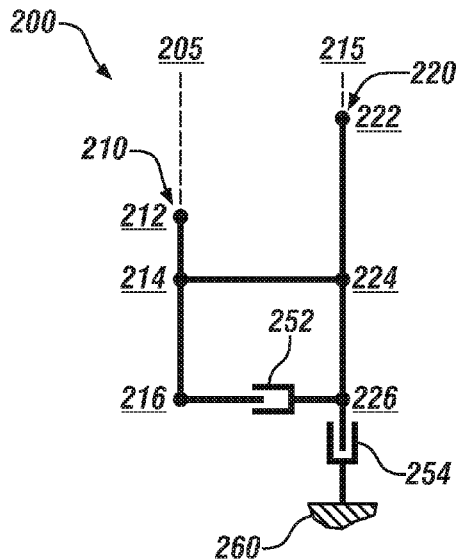
Figure 2:
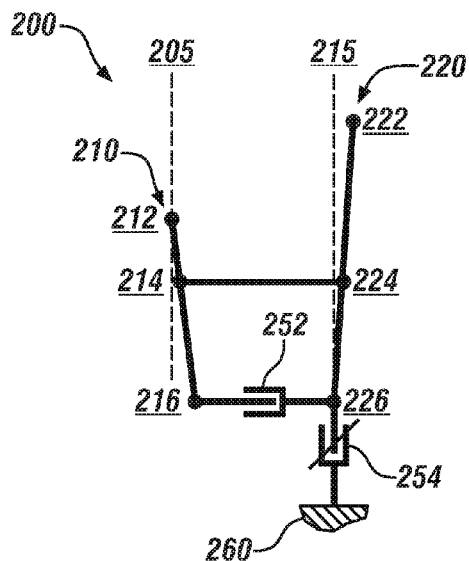

FIG. 2-1 is a lever diagram for an embodiment of the powertrain system 100 shown with reference to FIG. 1 including a portion of a transmission 200 that is configured to transfer torque between an internal combustion engine, first and second torque machines and an output member preferably coupled to a driveline of a vehicle. The transmission 200 includes first and second planetary gear sets 210 and 220, respectively, a rotating clutch 252, a grounding clutch 254, and a case ground 260. Rotational speeds of nodes of the first planetary gear set 210 are shown in relation to a first vertical axis 205 and rotational speeds of nodes of the second planetary gear set 220 are shown in relation to a second vertical axis 215. The first planetary gear set 210 includes a first node 212 preferably coupled to an engine, a second node 214 coupled to a rotating shaft 230, and a third node 216 coupled to a first torque machine and coupled to one element of the rotating clutch 252. The second planetary gear set 220 includes a first node 222 coupled to a second torque machine, a second node 224 coupled to the rotating shaft 230 and to an output member, and a third node 226 coupled to the other element of the rotating clutch 252 and coupled to one element of the grounding clutch 254. The other element of the grounding clutch 254 is coupled to the case ground 260. The horizontal positions of the aforementioned nodes indicate rotational speeds thereof. As shown, the powertrain system is not operating and the rotational speeds of all the nodes are zero, as indicated by their horizontal orientations relative to the first and second axes 205 and 215, respectively.

FIG. 2-2 depicts the transmission 200 operating in a continuously variable mode with the engine in the off state, i.e. not rotating. The rotating clutch 252 is deactivated, and the grounding clutch 254 is activated. Thus the third node 226 of the second planetary gear set 220 is at 0 RPM and the first node 212 of the planetary gear set 210 is at 0 RPM. The other nodes of the transmission 200 are spinning in response to the rotational speeds of the first and second torque machines as input to the third node 216 of the first planetary gear set 210 and the first node 222 of the second planetary gear set 220, which are commanded in response to an output torque request to achieve a commanded output speed at the second node 224 of the second planetary gear set 220. The rotational speeds of the nodes are indicated by their horizontal orientations relative to the first and second axes 205 and 215, respectively.

Figures 2, 3:
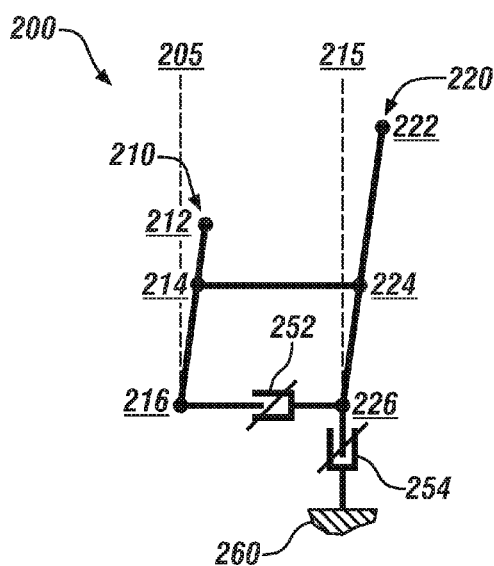
Figure 3:
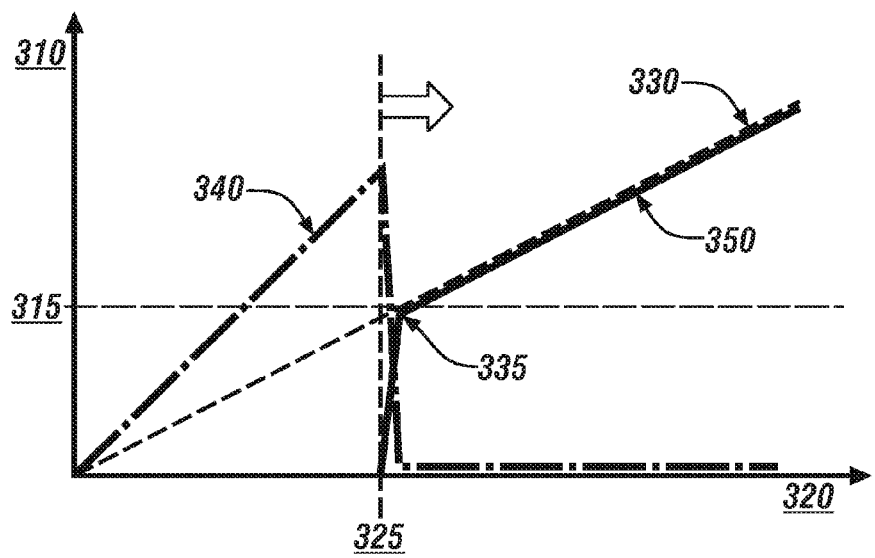

FIG. 2-3 depicts the transmission 200 operating in response to a command to transition the powertrain system from operating with the engine in the off state, i.e. not rotating, to operating in the on state, i.e., rotating and fueled and firing by activating the rotating clutch 252 when the grounding clutch 254 is activated. Thus the third node 226 of the second planetary gear set 220 is at 0 RPM and the third node 216 of the first planetary gear set 210 is transitioned to 0 RPM, and the first torque machine is at 0 RPM. The other nodes of the transmission 200 are spinning in response to the rotational speeds of the second torque machine, which are commanded in response to an output torque request to achieve a commanded output speed at the second node 224 of the second planetary gear set 220, and thus spin the engine speed up from 0 RPM to a predetermined speed, e.g., a minimum idle speed in response to the commanded output speed at the second node 224. The rotational speeds of the nodes are indicated by their horizontal orientations relative to the first and second axes 205 and 215, respectively.

There may be limitations associated with operating the powertrain 100 as described herein to execute engine autostart to transition the engine to the on state. The limitations include a minimum operating speed to provide sufficient moment of inertia to spin the unfired engine from the off state. The limitations include a maximum energy or speed, e.g., clutch speed to prevent overheating of the clutch during non-synchronous operation while the clutch is being applied. The clutch speed is a differential speed between elements of the clutch. Clutch speed is 0 RPM when a clutch is synchronized.

FIG. 3 graphically shows transmission output speed on the x-axis 320 in relation to various component speeds on the y-axis 310. Line 330 depicts the relationship between the engine input speed and the transmission output speed when the transmission is operating in one of the fixed gears, e.g., Gear 1. Line 340 depicts speed of the first torque machine or clutch speed of an oncoming clutch during operation in one of the continuously variable modes, e.g., EVT Mode 1. A component speed of interest is a minimum engine idle speed 315, which indicates a preferred minimum speed at which the engine can operate in a stable condition. In one embodiment, the minimum engine idle speed is 1000 RPM. The minimum engine idle speed can instead be set at another speed depending upon ambient temperature and altitude conditions, e.g., conditions associated with HVAC operation. Other conditions and engine configurations may dictate another minimum engine idle speed. A corresponding output speed is a minimum output speed 325, which is determined in relation to the minimum engine idle speed 315 and the relationship between the engine input speed and the transmission output speed when the transmission is operating in a selected one of the fixed gears, e.g., Gear 1, shown as Line 330. The minimum output speed 325 indicates a minimum required output speed to provide sufficient inertia to spin the engine unfueled when there is a mechanical coupling between the engine and the driveline, as required to effect the autostart operation. Operation that includes activating the oncoming clutch to start the engine as described herein with reference to FIG. 4 causes the transmission to mechanically couple the engine and the driveline by activating one of the clutches, and thus operate in the selected fixed gear to spin the engine using inertia of the vehicle transferred through the vehicle wheels. Point 335 indicates the minimum output speed that corresponds to the minimum engine idle speed (Line 325) required for stable operation of the engine. The engine input speed (Line 350) shows engine speed initially at 0 RPM during operation in the continuously variable mode. The engine input speed (Line 350) begins tracking the fixed gear speed (Line 330) when the clutch is applied and the transmission operates in the selected fixed gear, albeit with initial clutch slippage.

The transmission output speed is evaluated to determine whether it is permissible to activate the oncoming clutch due to operating limits associated with clutch slippage during activation of the oncoming clutch. Clutch slippage occurs during non-synchronous application of the oncoming clutch, and affects clutch temperature and clutch service life. Clutch slippage may be described in terms of clutch speed and clutch acceleration. Table 2 illustrates a plurality of clutch accelerations (Nc4 dot), peak clutch speeds (Peak NC4 speed), transmission output speeds, and corresponding vehicle speeds that are associated with activating one of the clutches, e.g., clutch C4 to shift the transmission from operating in one of the variable modes (EVT Mode 1—engine off) to operating in one of the fixed gear modes (Gear 1—engine on).

TABLE 2

| Nc4 dot (rpm/s) | Peak NC4 speed (rpm) Not to exceed clutch C4 energy of 4.3 kJ | Transmission output speed (rpm) | Vehicle speed (kph) |
| --- | --- | --- | --- |
| 10000 | 5240 | 1826 | 80 |
| 8000 | 4800 | 1673 | 73 |
| 6000 | 4080 | 1422 | 62 |
| 4000 | 3320 | 1157 | 51 |

The peak clutch speeds (Peak NC4 speed) indicate maximum speeds for engine start capability due to deceleration of the oncoming clutch. A clutch speed in excess of the peak clutch speed generates clutch energy in the oncoming clutch that exceeds allowable operation due to limits related to clutch temperature and other factors that affect clutch service life. A maximum engine start speed is defined by the dynamic capacity of the affected clutch and permissible duration of the clutch application in a non-synchronous state, which is limited by thermal effects of clutch slippage determined in relation to the clutch acceleration (Nc4 dot) and peak clutch speed (Peak NC4 speed).

Figure 4:
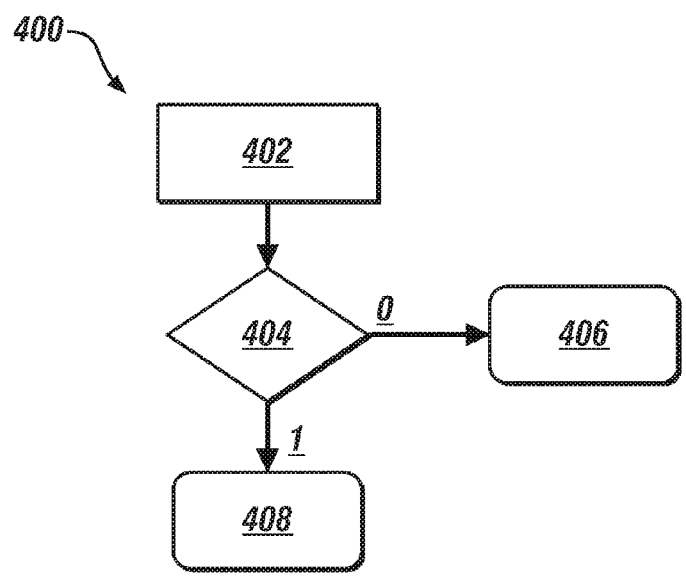
FIG. 4 illustrates a flowchart for a control scheme configured to operate a powertrain system including performing an autostart operation of the engine during ongoing powertrain operation, in accordance with the disclosure.

FIG. 4 schematically shows a flowchart for a control scheme 400 configured to operate a powertrain system, including performing an autostart operation of the engine during ongoing operation. The control scheme 400 is described with reference to an embodiment of the powertrain 110 described with reference to FIG. 1. Table 3 is provided as a key for the control scheme 400 of FIG. 4 wherein the numerically labeled blocks and the corresponding functions are set forth as follows.

TABLE 3

| BLOCK | BLOCK CONTENTS |
| --- | --- |
| 402 | Engine autostart request |
| 404 | Is clutch-driven autostart permissible? |
| 406 | Execute autostart sequence employing a torque machine to autostart the engine |
| 408 | Execute clutch-driven engine autostart operation |

During ongoing operation, the powertrain system may execute an engine autostop operation to stop the engine while the vehicle is operating, including circumstances when the vehicle is under motion. Subsequently, there may be a request to execute an engine autostart operation to start and operate the engine (402). An engine autostart request may be in response to an operator torque request via an accelerator pedal, or in response to an indication that stored power, e.g., battery power is approaching or is less than a minimum power threshold, or in response to another external command.

In response to the engine autostart request, it is determined whether a clutch-driven autostart operation is preferred, permissible and achievable (404). Present operating conditions dictate a need for and a capability of executing the clutch-driven autostart operation. The operating conditions are evaluated to determine whether the present operating mode is suitable for executing the clutch-driven autostart operation. The operating conditions are evaluated to determine whether the output speed is within an allowable range of speeds including a minimum output speed and a maximum output speed, with allowable hysteresis. Determining that the output speed is greater than the minimum output speed is described with reference to FIG. 3. Determining that the output speed is less than the maximum output speed is described with reference to FIG. 3 and Table 2. Determining that the output speed is less than the maximum output speed includes an evaluation to determine whether the system is capable of activating a selected one of the clutches to effect mechanical coupling between the engine and the driveline, with the evaluation based upon clutch slippage occurring during non-synchronous application of the oncoming clutch.

The operating conditions are evaluated to determine whether the stored energy is low, which occurs when a high-voltage battery is at a zero-discharge capability. The operating conditions are evaluated to determine whether one of the torque machines has been derated and thus incapable of executing the autostart operation. When any of the aforementioned conditions are not met (404)(0), an autostart operation employing one of the torque machines is executed to start the engine (406).

When the aforementioned conditions are met (404) (1), a clutch-driven engine autostart operation is executed to start the engine (408). The clutch-driven engine autostart uses inertia in the powertrain system and the driveline to spin the engine from a zero-speed condition while the vehicle is in motion. The sequence of events executed to perform the clutch-driven autostart includes activating an input damper to couple the engine to the input member of the transmission. Specific engine controls are disabled, e.g., engine speed controls, to avoid inadvertent execution of speed control schemes that could interfere with engine starting. A clutch speed deceleration rate is determined to evaluate and verify that there is suitable energy to start the engine without exceeding clutch energy limits.

Activation of the selected clutch is commanded to mechanically couple the engine to the driveline, and thus effect the clutch-driven autostart. When the engine speed achieves a predetermined threshold, fuel (and spark where employed) is supplied to the engine to fire the engine for operation. The predetermined engine speed threshold is preferably greater than engine speeds associated with natural frequencies of the engine. When the engine begins firing and generates power, the control scheme may opt to control the powertrain system with the transmission in either a fixed gear state or a continuously variable state in response to present operating conditions.

Execution of the clutch-driven autostart operation to start the engine facilitates a direct transition from an engine off state, e.g., in a continuously variable transmission state to an engine on state with the transmission in one of the fixed gears without employing one of the torque machines and without drawing electric power from the high-voltage battery 186.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system comprising an internal combustion engine, a multi-mode transmission and a driveline, the method comprising:
   in response to a command to execute an engine autostart operation during vehicle operation:
      executing a clutch-driven engine autostart operation to start the engine upon determining a present transmission output speed is greater than a minimum output speed for engine operation and upon determining a selected clutch configured to effect a mechanical coupling between the engine and the driveline is activatable;
      wherein executing the clutch-driven autostart operation includes:
         activating an input damper;
         disabling engine speed control;
         activating the selected clutch; and
         fueling and firing the engine when engine speed exceeds a threshold speed.

2. The method of claim 1, wherein determining the selected clutch configured to effect the mechanical coupling between the engine and the driveline is activatable comprises determining a deceleration rate of the selected clutch indicates a peak clutch energy is less than a predetermined magnitude.

3. The method of claim 1, wherein determining the selected clutch configured to effect the mechanical coupling between the engine and the driveline is activatable comprises determining clutch speed of the selected clutch is less than a predetermined threshold.

4. The method of claim 1, wherein determining the present transmission output speed is greater than the minimum output speed for engine operation comprises determining the present transmission output speed is greater than a minimum speed associated with engine idle operation.

5. The method of claim 1, further comprising employing a torque machine to autostart the engine upon determining the present transmission output speed is less than a minimum output speed associated with engine idle operation.

6. The method of claim 1, further comprising employing a torque machine to autostart the engine upon determining the selected clutch is incapable of activating within predetermined clutch speed constraints.

7. A method for controlling a powertrain system comprising an internal combustion engine, and a multi-mode transmission coupled to a driveline, the method comprising:
   in response to a command to execute an engine autostart operation during powertrain operation:
      determining whether a present transmission output speed is greater than a minimum output speed for engine operation associated with engine idle operation;
      determining activation capability of a selected clutch of the transmission, said selected clutch configured to mechanically couple the engine and the driveline to transfer torque therebetween; and
      upon determining the present transmission output speed is greater than the minimum output speed for engine operation associated with engine idle operation and determining the selected clutch is capable of activating within predetermined constraints, executing a clutch-driven engine autostart operation to start the engine comprising:
         activating the selected clutch when a clutch deceleration rate indicates a peak clutch energy is less than a predetermined magnitude; and
         fueling and firing the engine when engine speed exceeds a threshold speed.

8. The method of claim 7, wherein executing the clutch-driven autostart operation further comprises activating an input damper and disabling an engine speed control scheme prior to activating the selected clutch.

9. The method of claim 7, further comprising upon determining the present transmission output speed is not greater than the minimum output speed for engine operation associated with engine idle operation, employing a torque machine to autostart the engine.

10. The method of claim 7, further comprising upon determining the selected clutch is incapable of activating within the predetermined constraints, employing a torque machine to autostart the engine.

11. A method for controlling a powertrain system comprising an internal combustion engine and a multi-mode transmission mechanically coupled to a driveline, comprising:
   in response to a command to execute an engine autostart operation during vehicle operation:
      determining whether a transmission output speed is greater than a minimum output speed for engine operation at a minimum engine speed; and
      upon determining the present transmission output speed is greater than the minimum output speed for engine operation at the minimum engine speed and a selected clutch is capable of activating within constraints, executing a clutch-driven engine autostart operation to start the engine including:
         activating the selected clutch when a deceleration rate of the selected clutch indicates a peak clutch energy is less than a predetermined magnitude, and
         fueling and firing the engine when engine speed exceeds a threshold speed.

12. The method of claim 11, wherein the minimum engine speed is associated with engine idle operation.

13. The method of claim 11, further wherein the clutch-driven engine autostart operation is executed upon determining a clutch speed of the selected clutch is less than a predetermined threshold.

14. The method of claim 11, further comprising employing a torque machine to autostart the engine upon determining transmission output speed is less than the minimum output speed for engine operation at the minimum engine speed.

15. The method of claim 11, further comprising employing a torque machine to autostart the engine upon determining the selected clutch is incapable of activating within predetermined clutch speed constraints.

* * * * *